(12) United States Patent
Uemura et al.

(10) Patent No.: US 10,766,135 B2
(45) Date of Patent: Sep. 8, 2020

(54) TEACH PENDANT AND ROBOT CONTROL SYSTEM

(71) Applicant: FANUC CORPORATION, Minamitsuru-gun, Yamanashi (JP)

(72) Inventors: Norimitsu Uemura, Yamanashi (JP); Masaaki Uematsu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 112 days.

(21) Appl. No.: 16/197,925

(22) Filed: Nov. 21, 2018

(65) Prior Publication Data
US 2019/0160655 A1 May 30, 2019

(30) Foreign Application Priority Data
Nov. 28, 2017 (JP) .................. 2017-227509

(51) Int. Cl.
| | |
|---|---|
| *B25J 9/00* | (2006.01) |
| *G06K 9/00* | (2006.01) |
| *G06T 7/73* | (2017.01) |
| *B25J 9/16* | (2006.01) |
| *G06T 7/00* | (2017.01) |
| *G06K 9/22* | (2006.01) |

(52) U.S. Cl.
CPC ........... *B25J 9/0081* (2013.01); *B25J 9/1692* (2013.01); *G06K 9/00288* (2013.01); *G06K 9/00302* (2013.01); *G06T 7/0008* (2013.01); *G06T 7/75* (2017.01); *G05B 2219/39001* (2013.01); *G05B 2219/45104* (2013.01); *G06K 9/00228* (2013.01); *G06K 9/228* (2013.01); *G06T 2207/30164* (2013.01)

(58) Field of Classification Search
CPC ...... B25J 13/006; B25J 19/023; B25J 9/0081; G06T 2207/30164; G06T 7/30; G06T 7/75; G06K 2209/19; G06K 9/00214; G06K 9/228; G06K 9/4604; G06K 9/6204; G05B 19/401; G05B 2219/36167; G05B 2219/40099
See application file for complete search history.

(56) References Cited

U.S. PATENT DOCUMENTS

| | | | |
|---|---|---|---|
| 6,064,759 A | * | 5/2000 | Buckley ............... G01B 11/024 348/125 |
| 6,694,194 B2 | | 2/2004 | Oda et al. |
| 2002/0049510 A1 | | 4/2002 | Oda et al. |
| 2015/0242601 A1 | | 8/2015 | Griffiths et al. |
| 2015/0242605 A1 | | 8/2015 | Du et al. |
| 2015/0352718 A1 | | 12/2015 | Lee et al. |
| 2017/0348853 A1 | * | 12/2017 | Chang ..................... B25J 9/163 |
| 2018/0065211 A1 | | 3/2018 | Arimoto et al. |

(Continued)

FOREIGN PATENT DOCUMENTS

| | | |
|---|---|---|
| JP | 2002132487 A | 5/2002 |
| JP | 2009-119579 A | 6/2009 |

(Continued)

*Primary Examiner* — Ryan Rink
(74) *Attorney, Agent, or Firm* — RatnerPrestia

(57) ABSTRACT

A teach pendant for teaching a robot includes an operation unit disposed on a first surface of the teach pendant, to perform an input operation; a display unit disposed on the first surface; and a camera disposed on a second surface opposite the first surface of the teach pendant. An image captured by the camera is displayed on the display unit.

7 Claims, 6 Drawing Sheets

(56) References Cited

U.S. PATENT DOCUMENTS

2018/0370027 A1* 12/2018 Oota ................... B25J 9/1612
2019/0047145 A1*  2/2019 Akeel .................. B25J 9/1697
2019/0170694 A1*  6/2019 Xiong ................. G01M 17/007
2019/0202058 A1*  7/2019 Dai .................... B25J 9/1697

FOREIGN PATENT DOCUMENTS

| JP | 2010025615 A | 2/2010 |
| JP | 2012223859 A | 11/2012 |
| JP | 2017037434 A | 2/2017 |
| JP | 2017515178 A | 6/2017 |
| JP | 2017144454 A | 8/2017 |

* cited by examiner ical Display
TEACH PENDANT AND ROBOT CONTROL SYSTEM

CROSS-REFERENCE TO RELATED APPLICATION

This application is a new U.S. Patent Application that claims benefit of Japanese Patent Application No. 2017-227509, filed Nov. 28, 2017, the disclosure of this application is being incorporated herein by reference in its entirety for all purposes.

BACKGROUND OF THE INVENTION

1. Field of the Invention

The present invention relates to a teach pendant for a robot and a robot control system.

2. Description of Related Art

In the use environment of industrial robots, correction operation in production sites, using teach pendants, is required as measures against deviation in machining positions and operation paths of the robots from positions generated off-line in advance, owing to errors in jigs and workpieces, deviation in the positional relationship between a production line and a robot, and the like. As technologies to reduce burdens on operators in the action teaching operation, a technology in which an operation command in an operator's body coordinate system is converted into an operation command in a coordinate system to regulate the operation of a robot is known (for example, Japanese Unexamined Patent Publication (Kokai) No. 2009-119579).

SUMMARY OF THE INVENTION

However, in the production line sites, robots are sometimes used in unlighted dark environment. In such a site, an operator has to issue a correction command using a teach pendant, while visually checking a machining position or an operation path of the robot, thus putting a heavy burden on the operator and requiring long operation time. In addition, for example, depending on the workpiece, the machining position may be located at a portion that the operator cannot visually check without looking into there. In such an instance, it puts a heavy burden on the operator to issue a correction command using the teach pendant, while visually checking the machining position. In these cases, reducing the operation burdens of visually checking the machining position and issuing the correction command is also desired in order to improve operation efficiency.

An aspect of the present disclosure is a teach pendant for teaching a robot. The teach pendant includes an operation unit disposed on a first surface of the teach pendant, to perform an input operation; a display unit disposed on the first surface; and a camera disposed on a second surface opposite the first surface of the teach pendant. In this configuration, an image captured by the camera is displayed on the display unit.

Another aspect of the present disclosure is a robot control system that includes the above-described teach pendant; a robot controller connected to the teach pendant; and a robot connected to the robot controller. The robot is operated under control of the robot controller.

BRIEF DESCRIPTION OF THE DRAWINGS

The objects, features, and advantages of the present invention will be more apparent from the following description of an embodiment accompanying with the attached drawings. In the attached drawings.

DETAILED DESCRIPTION OF THE INVENTION

Figure 1:
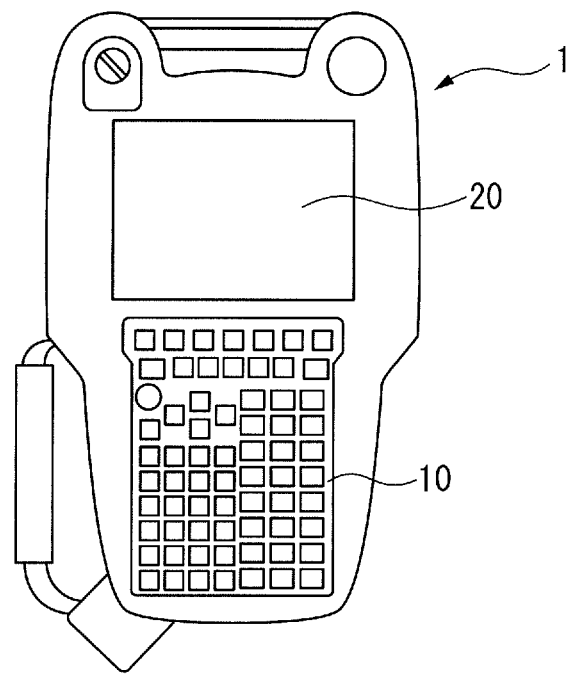
FIG. 1 is a front view of a teach pendant according to an embodiment.

An embodiment of the present disclosure will be described below in detail with reference to the attached drawings. In all the drawings, corresponding components are indicated with the same reference numerals. For ease of understanding, the scales of the drawings are modified in an appropriate manner. The embodiment shown in the drawings is just an example to embody the present invention, and the present invention is not limited to the embodiment.

FIG. 1 is a front view of a teach pendant 1 according to this embodiment. As shown in FIG. 1, the teach pendant 1 has an operation unit 10 on which an operator performs various types of input operations, and a liquid crystal display (LCD) 20 for displaying graphics. The operator can perform various types of input operations, such as designation of a teach point, by operation of the operation unit 10. When the surface having the operation unit 10 and the LCD 20 is defined as a front surface, the teach pendant 1 according to this embodiment has a camera 30 on a rear surface. The camera 30 may be configured to have an illumination function of illuminating an object, and a zoom function.

Figure 2:
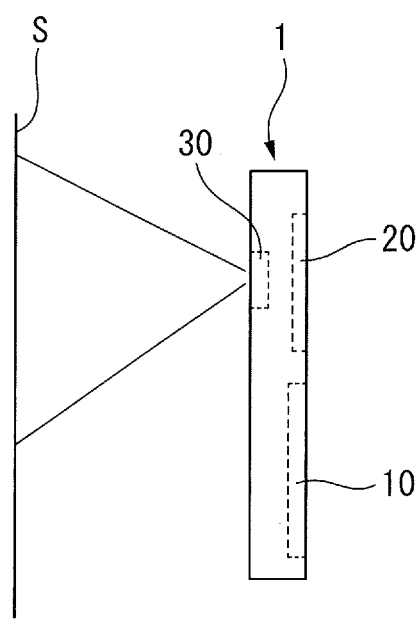
FIG. 2 is a schematic diagram of the teach pendant of FIG. 1, when viewed from a side.

FIG. 2 is a schematic diagram of the teach pendant 1, when viewed from a side, and shows the position of the camera 30 disposed on the rear surface. As shown in FIG. 2, the camera 30 can image an object S on the side of the rear surface of the teach pendant 1. An image captured by the camera 30 is displayed on the LCD 20. The camera 30 is disposed at an upper position on the rear surface of the teach pendant 1. Since the operation unit 10 is disposed in a lower portion on the front surface of the teach pendant 1, when the operator performs various types of input operations while holding the teach pendant 1 by his or her hand, the operator's hand does not block the field of view of the camera 30. Since the camera 30 is disposed directly in the rear of the LCD 20, the field of view of the camera 30 almost coincides with the field of view of the operator, thus improving convenience of the operator.

The teach pendant 1 is typically used in, for example, a welding point correction operation of a spot welding robot in an automobile production line. In the automobile production line, since the spot welding robot is usually used in an unlighted dark environment, the operator has to perform the welding point correction operation of the spot welding robot in the dark environment. Conventionally, in the welding point correction operation of the spot welding robot in such an environment, the operator directly and visually checks a welding point and inputs a correction command. On the contrary, the use of the teach pendant 1 according to this embodiment allows the operator to display a welding point of a workpiece and its vicinity on the LCD 20, as an easy-to-recognize image, and to thereby check whether the welding point is correct or not, on the image. Therefore, the operator can more reliably check and correct the welding point, with a reduced burden. The spot welding is often performed at a portion of a workpiece that a human's head is hard to get in. However, according to this embodiment, even in such a case, the operator makes the teach pendant 1 reach the portion that the human's head is hard to get in, while holding the teach pendant 1 by his or her hand. Thus, the image of the welding point and its vicinity is displayed on the teach pendant 1, and thereby the operator can reliably check the welding point.

Figure 3:
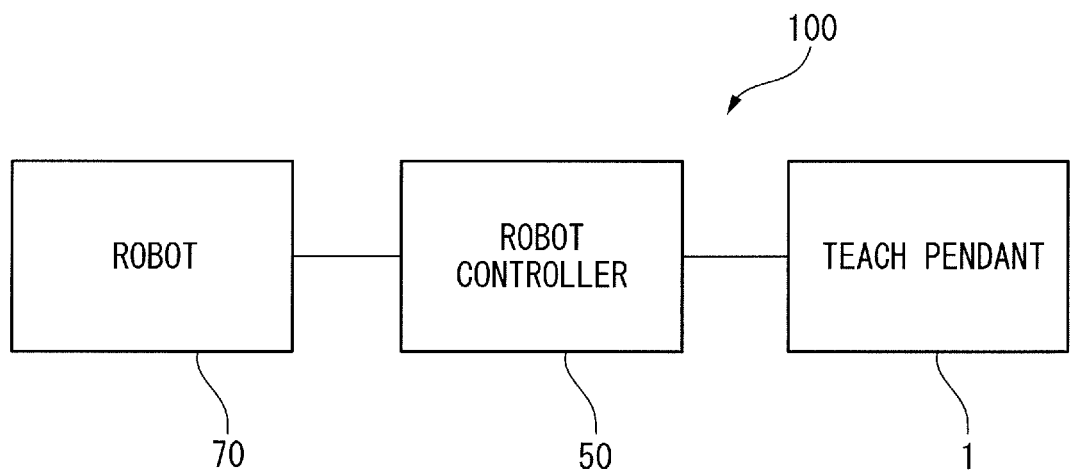
FIG. 3 is a block diagram showing the entire configuration of a robot control system.

FIG. 3 is a block diagram showing the entire configuration of a robot control system 100 that controls the spot welding robot and the like used in the above-described production line. As shown in FIG. 3, in the robot control system 100, a robot 70 and the teach pendant 1 are connected to a robot controller 50. In the robot controller 50, various types of data, including a robot program to control the operation of the robot 70, workpiece shape data, and the like, is stored in a memory device. The robot 70 is controlled by executing the robot program. Various types of action teaching data, such as a welding point position and the like inputted from the teach pendant 1, is sent to the robot controller 50 and reflected in the control of the robot 70. The robot controller 50 may be configured by a computer that has a CPU, memory devices such as a ROM, a RAM, and a hard disk, a communication interface, and the like.

Figure 4:
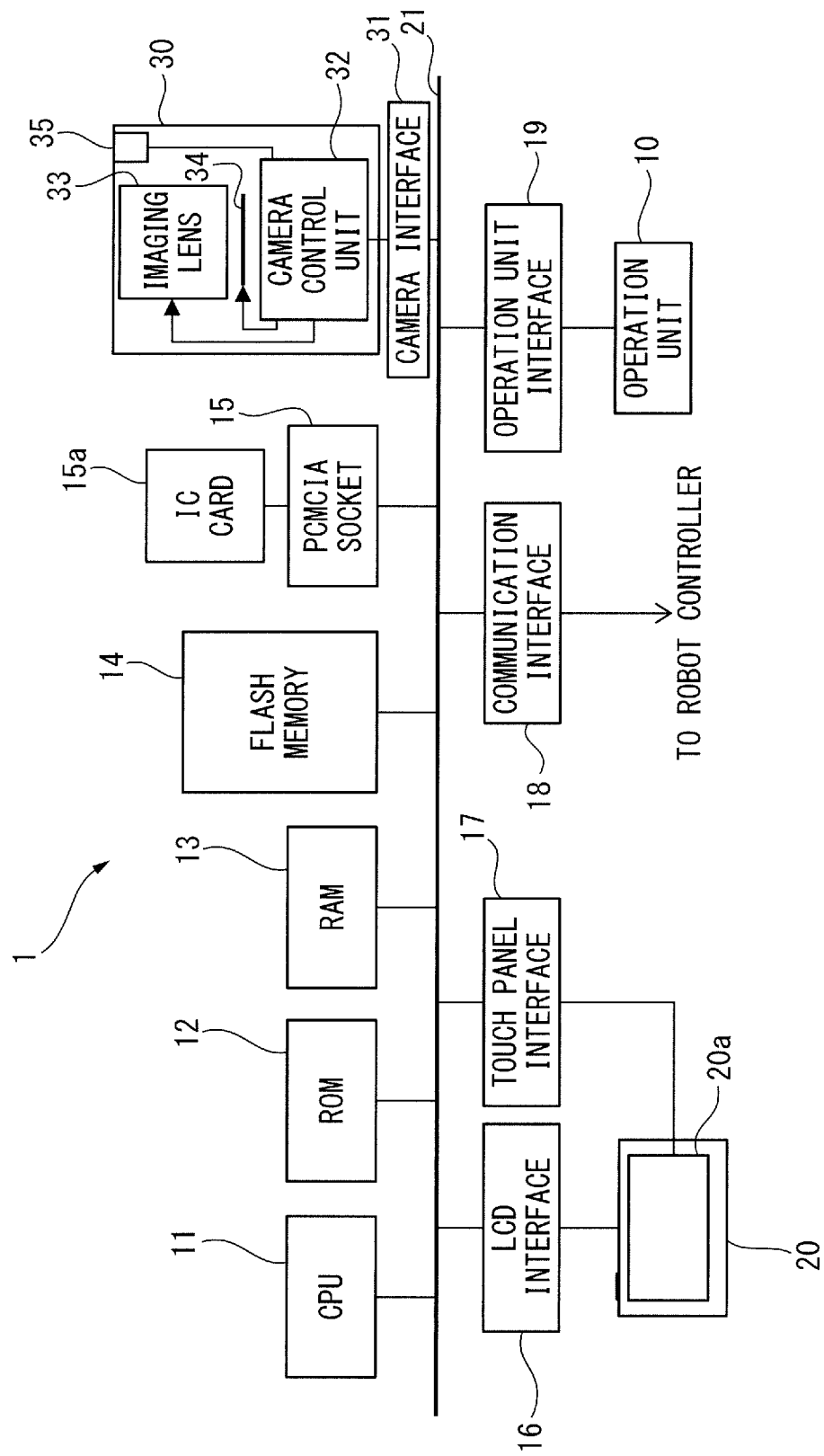
FIG. 4 is a drawing showing an example of hardware configuration of the teach pendant of FIG. 1.

FIG. 4 is a drawing showing an example of hardware configuration of the teach pendant 1. As shown in FIG. 4, the teach pendant 1 includes a CPU 11, a ROM 12, a RAM 13, a flash memory 14, a PCMCIA socket 15 based on PCMCIA (personal computer memory card international association) standards to insert an IC card 15a therein, a liquid crystal display (LCD) interface 16, a touch panel interface 17, a communication interface 18 to be connected to the robot controller 50, and an operation unit interface 19, which are each connected through a bus 21. The teach pendant 1 further includes the LCD 20 connected to the LCD interface 16, a touch panel 20a that is attached to a display surface of the LCD 20 and connected to the touch panel interface 17, and the operation unit 10 connected to the operation unit interface 19.

Furthermore, in the teach pendant 1 of this embodiment, a camera interface 31 is connected to the bus 21. To the camera interface 31, the camera 30 is connected. The camera 30 includes a camera control unit 32, an imaging lens 33 having a zoom function, an image sensor 34, and an illumination device 35 (e.g. an LED light). The imaging lens 33 and the image sensor 34 are connected to the camera control unit 32, and controlled by the camera control unit 32. The camera control unit 32 controls the operation of the imaging lens 33 and the image sensor 34 to perform various types of operations, such as autofocusing, zooming, real time video capturing, and static image capturing. In this configuration, various types of operation commands (actuation of the camera 30, capture of a static image, zooming, and the like) that are inputted by the operator's operation on the operation unit 10 for the camera 30 are inputted to the camera control unit 32 through the CPU 11, and the operations corresponding to the operation commands are thereby performed.

Figure 5:
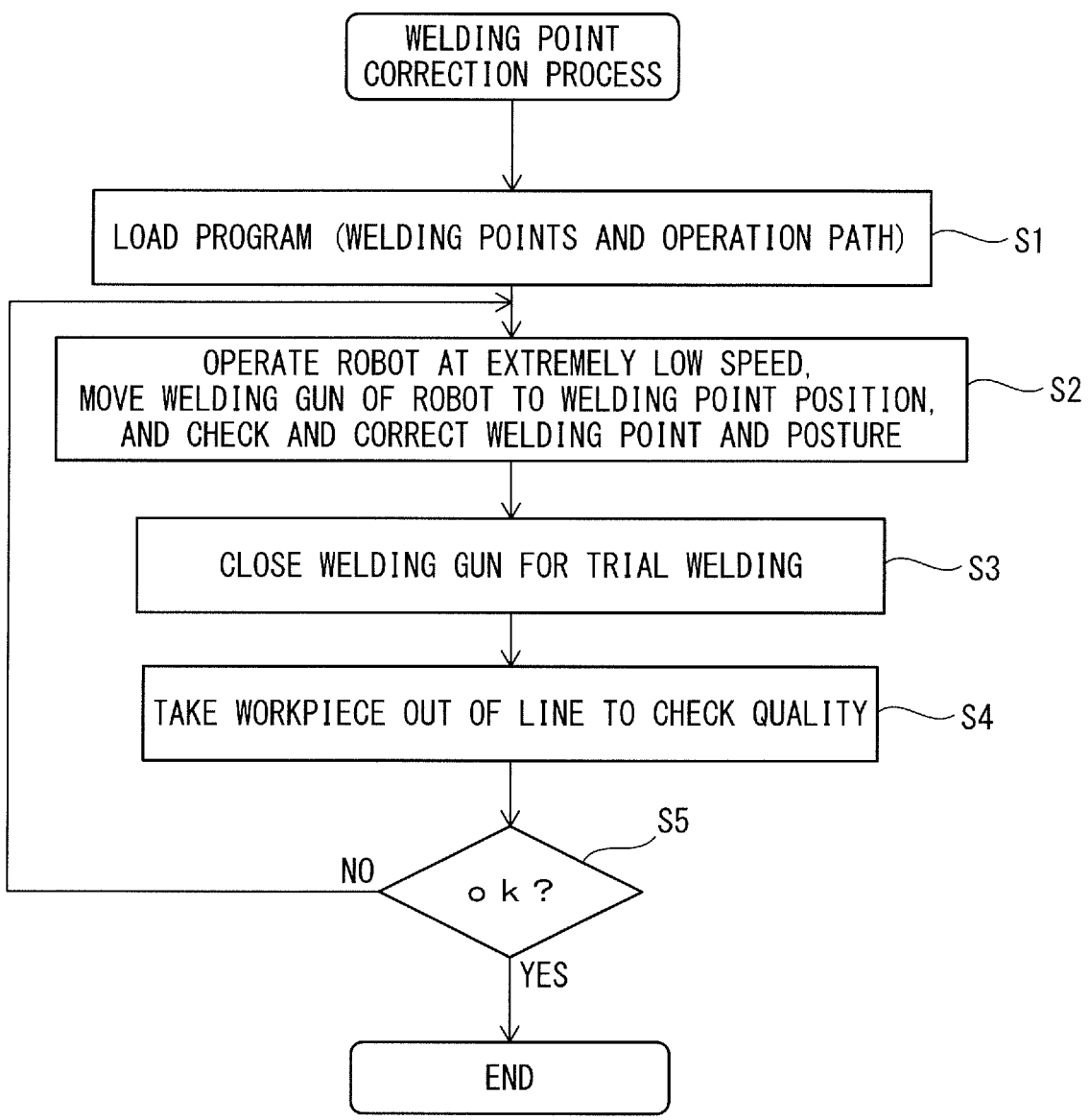
FIG. 5 is a flowchart showing the operation of correcting a spot welding point.

Next, referring to FIG. 5, an example of a flow of a spot welding point correction operation, when a welding robot is used as the robot 70 in the robot control system 100, will be described. FIG. 5 is a flowchart showing the flow of the spot welding point correction operation. For example, taking an automobile production line as an example, when a new car model is on the production line, it is required to perform teaching corrections on welding points and postures, due to errors of various jigs and workpieces and the positional relationship between the production line and the robot. When a motor or a reduction gear is exchanged, it is also required to perform teaching corrections on the welding points and the postures, due to a deviation of an origin point of the robot. The welding point correction operation of FIG. 5 is performed in such cases.

First, in step S1, a program including data about welding points and an operation path, which is generated based on workpiece model data and the like by simulation, is loaded into the robot controller 50. The robot 70 can be thereby operated in accordance with the loaded program. Next, the operator operates the robot 70 at an extremely low speed by an operation on the teach pendant 1, and moves a spot welding gun to the position of a welding point. The operator checks whether or not the welding point and the posture of the spot welding gun, before closing, are correct. If necessary, the operator adjusts the position of the welding point and the posture, using the teach pendant 1 (step S2). In this instance, the operator captures an image of the spot welding gun around a chip by the camera 30 of the teach pendant 1, and displays the image on the LCD 20 to perform checking. The operator displays a magnified image of the spot welding gun around the chip using the zoom function of the camera 30, or captures a bright image using the illumination function, as necessary, and therefore the operator can check the welding point and the posture of the spot welding gun with the easy-to-check image. As to a welding point at a portion that the operator cannot visually check without looking into there, the operator makes the teach pendant 1 reach the welding point, while holding the teach pendant 1 by his or her hand, and displays an image of the welding point and its vicinity on the LCD 20. Therefore, it is possible to reduce a burden on the operator.

When the check and correction of the welding point is finished, the spot welding gun is closed and performs trial welding (spot welding) (step S3). Next, the workpiece (body) is taken out of the line, to check the quality of the spot (checking for a deviation amount and the like) (step S4). If there is a problem in the quality (NO in S5), the steps from the welding point correction (step S2) are repeated. If there is no problem in the quality (YES in S5), this process is ended.

According to the above-described welding point correction process using the teach pendant 1, the operator can check and correct the welding point and the posture, while watching the easy-to-recognize image displayed on the LCD 20. Therefore, it is possible to reduce a load on the operator for the welding point correction, thus allowing an increase in operation efficiency and a reduction in operation time.

Next, information (hereinafter also referred to as assistance information) to be displayed on the LCD 20 to assist the operator, when the operator checks the welding point and the posture, will be described.

A first example of the assistance information is guidance information displayed, when the operator has finished the check and correction steps on a welding spot (welding point), to indicate another welding point that is in the vicinity of the welding point and that is to be next processed. As an example of guidance, an icon (an arrow or the like) that indicates the direction of the welding point to be next processed (i.e., a direction to which the camera 30 is next directed) is cited. To realize this function, a robot program that includes welding points and an operation path of the robot 70, and workpiece (body) model data are stored in advance in, for example, the RAM 13. For example, when the operator designates an operation mode to display the assistance information, by performing a predetermined operation on the operation unit 10, a two-dimensional image of a part of a workpiece (body), which is captured by the camera 30 and is being displayed on the LCD 20, is matched to the workpiece (body) model data stored in the teach pendant 1. The position of the display image is identified in a workpiece model, and the position of a welding point is thereby identified in the display image. As an image process to match the two-dimensional image captured by the camera 30 to the workpiece model data and to identify the position of the two-dimensional image in the workpiece model, an image matching technology generally known in this technical field in which features (edges, contours, and the like) are extracted from each of the two-dimensional image and the workpiece model data to perform matching may be used. The position of the identified welding point may be displayed in the display image in an overlaid manner using an icon or the like. When the operator designates a welding point the correction of which has been finished, by, for example, a touching operation of the display image, an uncorrected welding point that is the nearest to the welding point (for example, an uncorrected welding point that is out of a frame of the display image) is identified as a welding point to be next processed. In the currently displayed image, information to designate the position of the next welding point is displayed in an overlaid manner, as, for example, an arrow icon.

Figure 6:
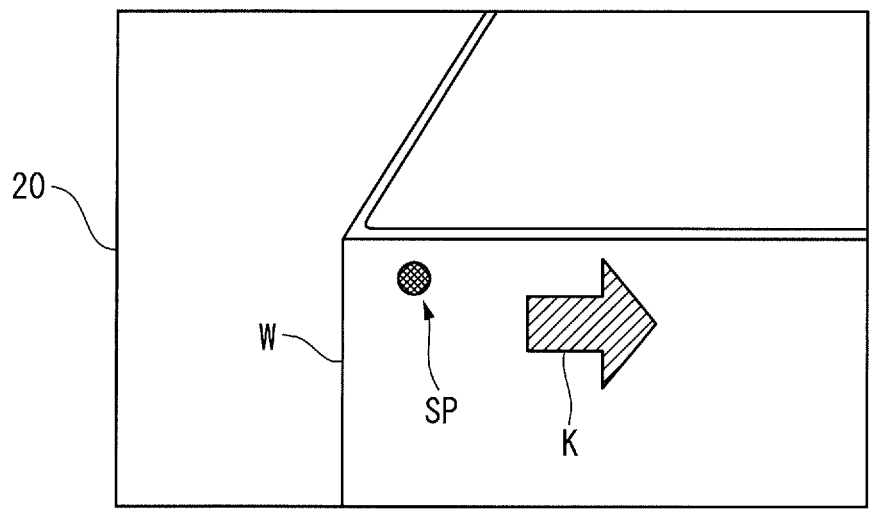
FIG. 6 is a drawing showing a first example of an image to assist an operator in a welding point checking and correcting operation.
Figure 7:
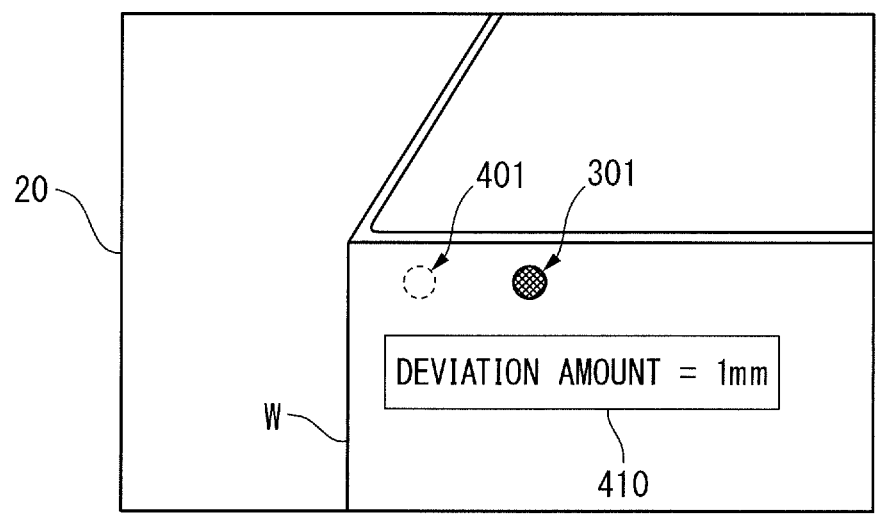
FIG. 7 is a drawing showing a second example of the image to assist the operator in the welding point checking and correcting operation.

FIG. 6 shows a guidance information display example. In FIG. 6, a welding point SP on a workpiece W is a welding point the correction operation of which is finished. When a user designates the welding point SP as a welding point the correction operation of which is finished, by a touching operation, an arrow icon K that indicates the direction of a welding point to be next processed (a welding point out of a frame of the display image of FIG. 6) is displayed in an overlaid manner. This operation is realized by an image processing program that is executed by the CPU 11 of the teach pendant 1. As a second example of the assistance information, information about a deviation amount between an actual spot welding trace position and a datum spot welding position (target processing point) is displayed on an image in an overlaid manner. To actualize this function, as in the case of the above-described first example, the robot program that includes the welding points and the operation path of the robot 70, and the workpiece (body) model data are stored in advance in, for example, the RAM 13 of the teach pendant 1. When an operator designates this operation mode, by performing a predetermined operation on the operation unit 10, a two-dimensional image of a part of a workpiece (body), which is captured by the camera 30 and is being displayed on the LCD 20, is matched to the workpiece (body) model data stored in the teach pendant 1. The position of the display image is identified in a workpiece model, and the position of a welding point is thereby identified in the display image. Furthermore, the position of an actual spot welding trace is identified by analyzing the display image. Information about a deviation amount between the actual spot welding trace position (indicated with a reference numeral 301 in FIG. 7) and the datum spot position (indicated with a reference numeral 401 in FIG. 7) is displayed on the display image in an overlaid manner ("DEVIATION AMOUNT=1 mm" in FIG. 7). FIG. 7 is an example of a display screen in the above operation. In FIG. 7, the reference numeral 301 indicates the actual spot welding position, and the reference numeral 401 indicates an icon that is displayed in the original spot welding position. Information 410 about a deviation amount between the actual spot welding position 301 and the original spot welding position 401 is displayed on the display image in an overlaid manner. Displaying the image to assist the checking and correcting operation of the welding position by the operator, as described above, allows a further improvement in efficiency of the welding point correction operation. The above operation can be realized by an image processing program that is executed by the CPU 11 of the teach pendant 1.

The embodiment of the present invention is described above, but it is apparent for those skilled in the art that the present invention can be variously corrected or modified without departing from the scope of claims described below.

Figure 8:
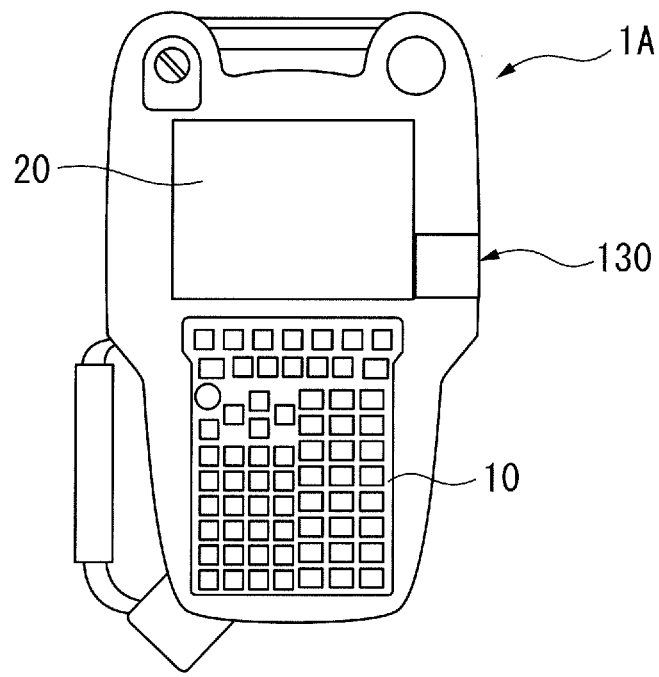
FIG. 8 is a drawing showing an example of the structure of a teach pendant having a camera on a front surface thereof.

The teach pendant 1 according to the above embodiment has the camera on its rear surface, but it is conceivable that a camera may be also provided on a front surface, in addition to the camera 30 on the rear surface. FIG. 8 is a front view of a teach pendant 1A having a camera 130 on a front surface, in addition to the camera 30 on the rear surface. The camera 130 on the front surface may be used for, for example, face authentication of an operator. This configuration can improve security performance. As a face authentication process, for example, a general technology in this field in which features (a contour, the positional relationship of eyes and a nose, and the like) in the operator's face image of images captured by the camera 130 are matched to an image database, to identify a person, may be used. This face authentication process may be configured as a program that is executed by the CPU 11 of the teach pendant 1.

To solve the object of this disclosure, the following various aspects and the effects thereof can be provided. In the following description of the aspects, parenthesized numbers correspond to the reference numerals of the drawings of the present disclosure.

For example, a first aspect of the present disclosure includes a teach pendant (1) for teaching a robot. The teach pendant (1) includes an operation unit (10) disposed on a first surface of the teach pendant, to perform an input operation; a display unit (20) disposed on the first surface; and a camera (30) disposed on a second surface opposite the first surface of the teach pendant (1). An image captured by the camera (30) is displayed on the display unit (20).

According to the first aspect, it is possible to reduce a burden on an operator in a processing point checking and correcting operation.

According to a second aspect of the present disclosure, in the teach pendant of the first aspect, the operation unit (10) is disposed on a lower side of the first surface in an operating state of the teach pendant (1), and the camera (30) is disposed on an upper side of the second surface in the operating state.

According to a third aspect of the present disclosure, in the teach pendant of the first or second aspect, the camera (30) has a zoom function.

According to a fourth aspect of the present disclosure, in the teach pendant of any one of the first to third aspects, the camera (30) has an illumination function.

According to a fifth aspect of the present disclosure, the teach pendant of any one of the first to fourth aspects further includes a first surface side camera (130) disposed on the first surface. The first surface side camera (130) is used for face authentication of the operator.

According to a sixth aspect of the present disclosure, the teach pendant of the fifth aspect further includes a face authentication processing unit (11) configured to perform a face authentication process based on an image captured by the first surface side camera (130).

According to a seventh aspect of the present disclosure, the teach pendant (1) of any one of the first to sixth aspects further includes an image processing unit (11) configured to identify a position of a part of a workpiece, captured by the camera (30) as a captured image, in a shape model of the workpiece, based on information about processing points of the robot on the workpiece and information about the shape model of the workpiece, and to display, on the captured image, information about a processing point that is in a vicinity of a processing point included in the captured image and that is outside a frame of the captured image.

According to an eighth aspect of the present disclosure, the teach pendant (1) of any one of the first to sixth aspects further includes an image processing unit (11) configured to identify a position of a part of a workpiece, captured by the camera (30) as a captured image, in a shape model of the workpiece, based on information about processing points of the robot on the workpiece and information about the shape model of the workpiece, and to display, on the captured image, information about a deviation between a position of an actual processing point trace included in the captured image and a position of a target processing point corresponding to the actual processing point trace.

A ninth aspect of the present disclosure is a robot control system (100) that includes the teach pendant (1) according to any one of the first to eighth aspects; a robot controller (50) connected to the teach pendant (1); and a robot (70) connected to the robot controller (50). The robot (70) is operated under control of the robot controller (50).

Figure 9:
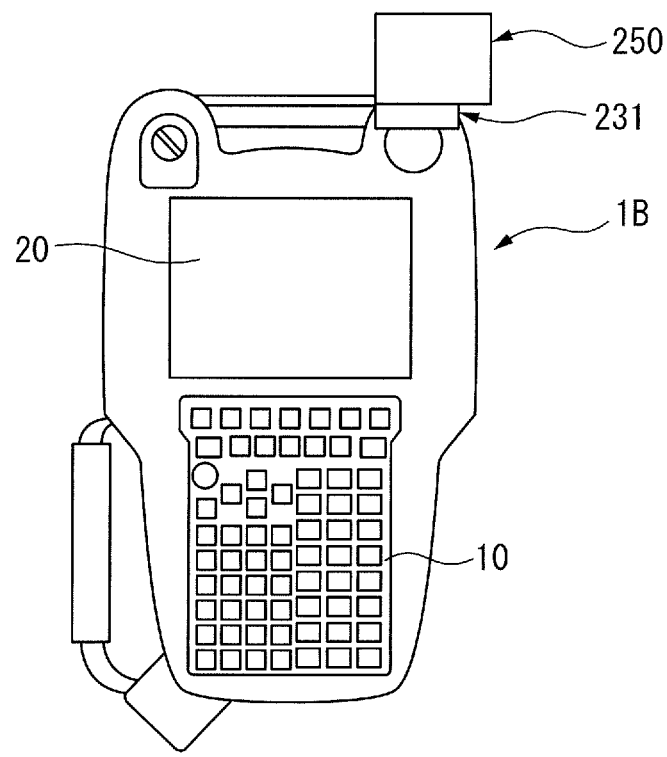
FIG. 9 is a reference drawing showing the structure of a teach pendant in which a camera interface is installed, and an external camera is attached thereto.

Next, a configuration example of a teach pendant that has a camera interface to connect an external camera will be described as a reference example, though the teach pendant does not embody the present invention. FIG. 9 is a front view showing the structure of a teach pendant 1B. As shown in FIG. 9, the teach pendant 1B has a camera interface 231. To the camera interface 231, an external camera 250 is connected. The external camera 250 is configured to capture, for example, a video image on a rear surface side of the teach pendant 1B. According to this configuration, the same effects as in the above embodiment can be achieved.

The invention claimed is:

1. A teach pendant for teaching a robot comprising:
   an operation unit disposed on a first surface of the teach pendant, to perform an input operation;
   a camera disposed on a second surface opposite the first surface of the teach pendant;
   a display unit disposed on the first surface, the display unit displaying an image captured by the camera; and
   an image processing unit configured to identify a position of a part of a workpiece, captured by the camera as a captured image, in a shape model of the workpiece, based on information about processing points of the robot on the workpiece and information about the shape model of the workpiece, and to display, on the captured image, information about an uncorrected processing point that is nearest to a processing point included in the captured image and that is outside a frame of the captured image.

2. The teach pendant according to claim 1, wherein the operation unit is disposed on a lower side of the first surface in an operating state of the teach pendant, and the camera is disposed on an upper side of the second surface in the operating state.

3. The teach pendant according to claim 1, wherein the camera has a zoom function.

4. The teach pendant according to claim 1, wherein the camera has an illumination function.

5. The teach pendant according to claim 1, further comprising a first surface side camera disposed on the first surface.

6. The teach pendant according to claim 5, further comprising a face authentication processing unit configured to perform a face authentication process based on an image captured by the first surface side camera.

7. A robot control system comprising:
   the teach pendant according to claim 1;
   a robot controller connected to the teach pendant; and
   a robot connected to the robot controller, the robot being operated under control of the robot controller.

* * * * *